United States Patent
Petro et al.

[11] 3,792,224
[45] Feb. 12, 1974

[54] METHOD FOR MAKING NON-TANGLING BEADED FILAMENT COILS

[75] Inventors: James Petro, Little Falls; Clair M. Rively, Old Bridge, both of N.J.

[73] Assignee: Westinghouse Electric Corporation, Pittsburgh, Pa.

[22] Filed: July 19, 1971

[21] Appl. No.: 163,651

Related U.S. Application Data

[62] Division of Ser. No. 792,988, Jan. 22, 1969, abandoned.

[52] U.S. Cl.......... 219/121 LM, 29/25.17, 140/71.5, 219/153, 313/271, 313/343, 313/344, 313/345, 331/94.5 A
[51] Int. Cl............................................. B23k 27/00
[58] Field of Search.... 219/121 EB, 121 L, 153, 68; 140/71.5; 313/343, 344, 345, 271; 29/25.15, 25.17; 331/94.5 A

[56] References Cited
UNITED STATES PATENTS

| | | | |
|---|---|---|---|
| 3,402,466 | 9/1968 | Phillips | 219/137 |
| 3,287,591 | 11/1966 | Sloan | 313/271 |
| 2,359,302 | 10/1944 | Curtis | 313/344 |
| 3,346,761 | 10/1967 | Ackerman | 313/344 |
| 2,462,837 | 3/1949 | Braunsdorff | 313/271 |
| 3,484,644 | 12/1969 | Pertwee | 313/271 |

OTHER PUBLICATIONS

"The Laser in Machining and Welding" Metal Progress, pp. 150, 152, 154, 156, 158 2/67
"Lasers in Industry" IEEE, of IEEE February 1969, pp. 114–124
"Laser Applications in Metal Working" The Tool and Manufacturing Engineer 24–28

*Primary Examiner*—J. V. Truhe
*Assistant Examiner*—George A. Montanye
*Attorney, Agent, or Firm*—D. S. Buleza

[57] ABSTRACT

The tangling of hellically-coiled wire articles during bulk handling and shipment is prevented by providing integral modules or beads of fused metal at each end of the articles which enclose the severed ends of the wire. In the case of tungsten wire coils that are designed for use in electric lamps and similar devices and are wound on iron mandrels, the fused beads are composed of tungsten-iron alloy and formed in situ during coil manufacture by melting the ends of the mandrel with a concentrated heat source such as a focused laser beam. The tungsten-iron alloy beads remain on the end turns of the coil during the subsequent mandrel-dissolving operation, are ductile and are formed without embrittling the tungsten wire.

Various methods and an apparatus for manufacturing such beaded-end coils on a mass production basis using a $CO_2$ laser are disclosed.

Since the beads can readily be made larger than the diameter of the coil and be spaced a predetermined distance apart, they provide built-in guides or "reference points" for mounting incandescent lamp type filament coils on their lead wires and thus accurately controlling the lighted-length of the mounted coils.

6 Claims, 23 Drawing Figures

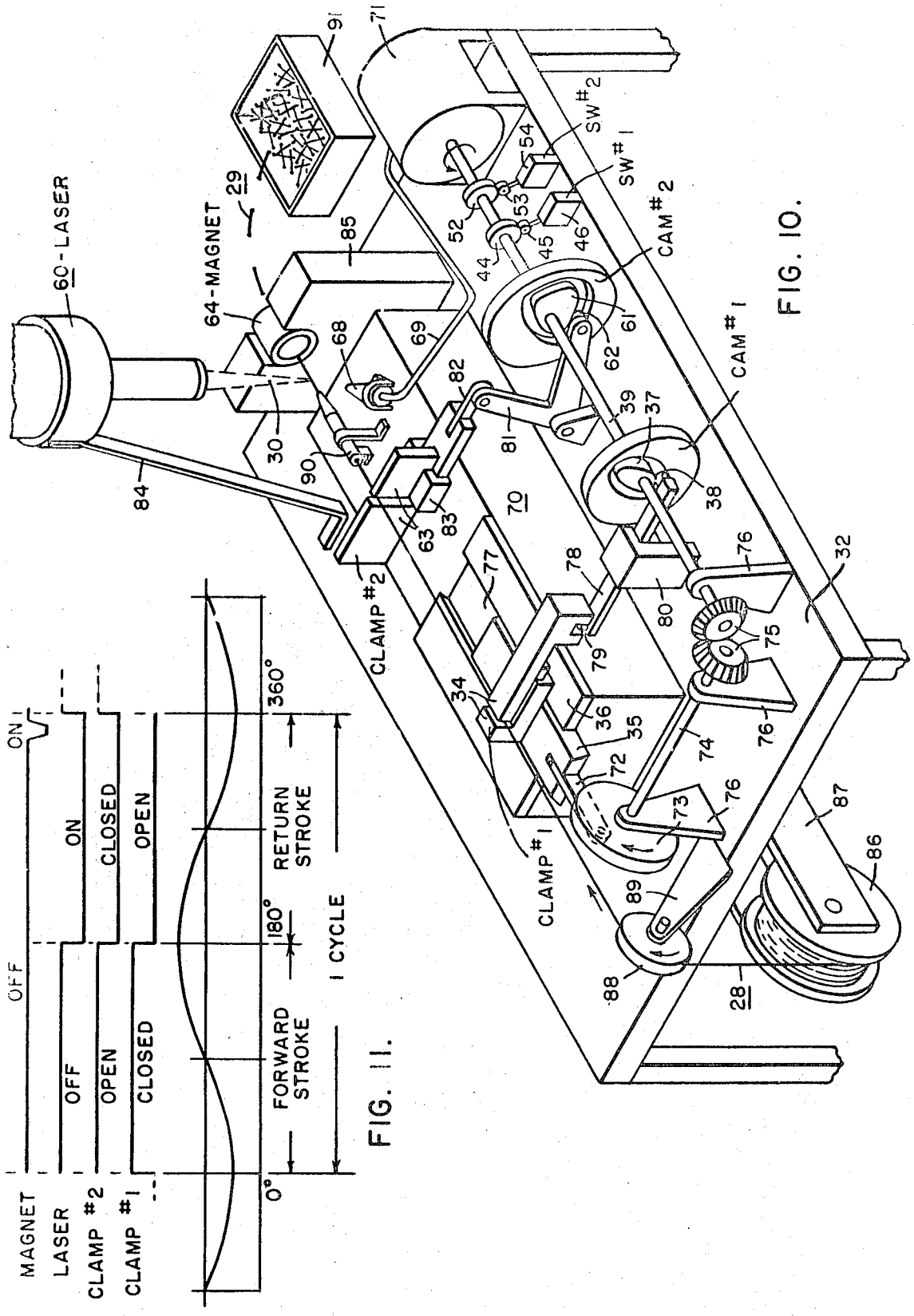

METHOD FOR MAKING NON-TANGLING BEADED FILAMENT COILS

CROSS-REFERENCE TO RELATED APPLICATION

This application is a division of copending application Ser. No. 792,988, filed Jan. 22, 1969, now abandoned in favor of continuation application Ser. No. 317,880 filed Dec. 22, 1972.

BACKGROUND OF THE INVENTION

1. Field of the Invention

The present invention relates to the manufacture of coiled articles such as filament coils for electric lamps and has particular reference to a method and apparatus for manufacturing "tangle-free" wire coils.

2. Description of the Prior Art

As is well-known, filamentary coils for fluorescent and incandescent lamps are manufactured by winding a tungsten wire around a mandrel of dissimilar metal, such as iron, mechanically cutting the resulting composite wire into segments of the desired length, and chemically dissolving the mandrel to provide the desired individual coils of tungsten wire. In the case of so-called "barrelless" electrode coils currently being used as cathodes in fluorescent lamps, the coil consists of a coiled tungsten core wire that is enclosed in a loose over-winding of fine tungsten wire which provides a "basket-like" structure for the electron-emission material. Since the tungsten core wire is of small diameter, a burr is formed when it is cut during the coil manufacturing operation. Consequently, the burred ends of the loose-fitting core wires protrude from the ends of the coil and are of such size that they snag and interlock with the turns of other coils when such coils are placed in a container or hopper and contact one another. In the extreme, the tangling becomes so complete that it is possible to lift the entire contents of a container that holds hundreds of coils simply by gripping and pulling one end of a single coil.

Because of this inherent tendency of such barrelless fluorescent lamp coils to tangle, it has been extremely difficult to design satisfactory coil feeder which will automatically separate and supply the coils to a mounting machine. The prior art coils, accordingly, had to be manually separated and fed into the mounting machine. This is a time-consuming tedious operation and materially increases the manufacturing cost of the lamps. In addition, large quantities of finished coils sometimes had to be scrapped during inspection because it was impossible to untangle them. The percent shrinkage is thus very high and further increases the lamp manufacturing cost.

The present invention provides an economical and practical solution to the aforementioned tangling problem and reduces the manufacturing cost of electric lamps by providing a method and apparatus for making electrode coils which are so conformed that they can be readily separated and fed into the mount-making machine by an automatic coil-feeder.

SUMMARY OF THE INVENTION

The aforesaid objectives and other advantages are achieved in accordance with the present invention by providing an integral nodule or bead of fused ductile metal at each end of the coiled articles. In the case of a fluorescent lamp electrode coil of barrelless construction, the ends of the iron mandrel are melted in situ and form pools of molten iron which dissolve the overlying tungsten wire turns, thus producing integral beads of tungsten-iron wire alloy that are fused to and merge with the respective end turns of tungsten wire. The beads are formed in such a manner that the coil turns remain in their original unrecrystallized state. Since the beads contain tungsten, they are not dissolved by the acid used to dissolve and remove the iron mandrel so that the finished coils are terminated by ductile beads that close the respective end turns of the coil and merge with and enclose the severed ends of the tungsten core wire and overwinding of fine tungsten wire. The finished coils can thus be processed, inspected and shipped en masse without becoming tangled or fracturing. Shrinkage during manufacture and handling is drastically reduced and the coils readily separate for automatic feeding into the mount-making machine.

The beads of fused tungsten-iron alloy can be formed on the ends of precut coils that still contain their iron mandrels. However, the severing and beading of the coils are preferably achieved simultaneously by indexing a continuous mandrel-coil stock wire in front of a laser, energizing the laser in timed sequence with the wire-indexing speed so that the focused laser beam strikes the mandrel component of the stock wire at a point located a selected distance from the free end of the wire, and then applying an axial pull on the free end of the stock wire after the laser beam has melted the iron mandrel and formed a pool of molten tungsten-iron alloy. By properly adjusting the wire-indexing speed, the duration and intensity of the laser beam and the timing and speed with which the end segment is pulled away from the stock wire, non-recrystallized mandrel-containing embryonic coils of precisely controlled length with ductile beads formed at each end can be very rapidly produced. These embryonic coils are then immersed in an acid bath which dissolves the iron mandrels and provides finished tungsten electrode coils having beaded ends.

An apparatus for automatically carrying out the aforementioned sequence of steps utilizing cam-operated clamping jaws to feed the stock wire past the laser, and cam-operated switches for controlling the laser and energizing an electromagnetic coil which separates the end segment from the supply of stock wire is provided.

Various methods for forming such tungsten-iron alloy beads on the ends of finished refractory wire coils or as integral parts of leg inserts for a filament coil are also provided.

Another advantage afforded by the present invention is the provision of an improved filament mount assembly wherein the "lighted length" of the filament coil is controlled by means of enlarged integral beads on the ends of the coil which serve as reference points for securing the lead wires to the coil legs during the filament-mounting operation.

BRIEF DESCRIPTION OF THE DRAWINGS

A better understanding of the invention will be obtained by referring to the exemplary embodiment shown in the accompanying drawings, wherein:

FIG. 10 is a perspective view of a production machine embodying the principles and features shown schematically in the FIGS. 9a to 9d;

FIG. 11 is a phase diagram illustrating the sequence of operation of the various components of the machine as the latter indexes through one complete cycle;

DESCRIPTION OF THE PREFERRED EMBODIMENTS (FIGS. 1–6)

Figure 1:
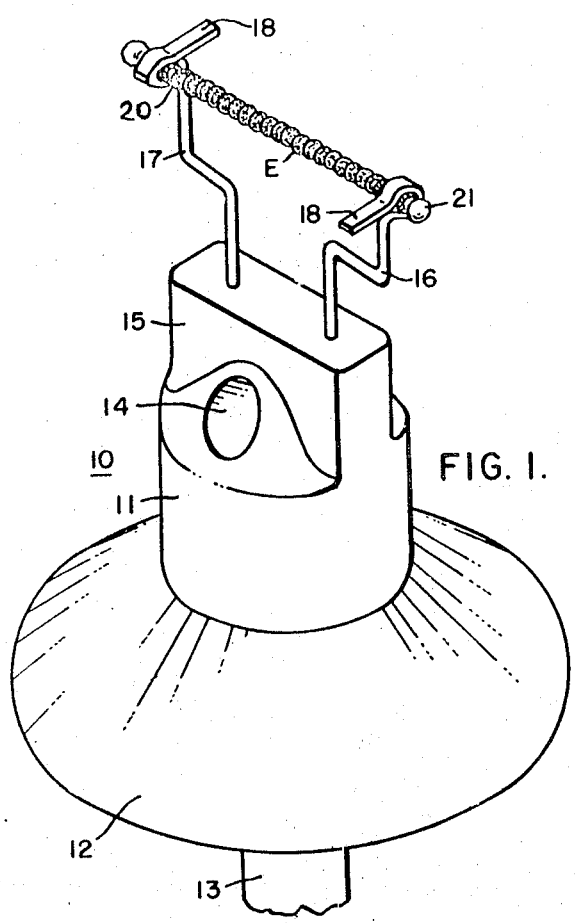
FIG. 1 is an enlarged perspective view of a mount assembly for a fluorescent lamp which incorporates the improved barrelless "beaded-end" electrode.

In FIG. 1 there is shown a mount assembly 10 for a 40 watt T12 fluorescent lamp. The mount 10 consists of the usual glass stem 11 that has a flare 12 at one end and an axially depending glass exhaust tube 13 which extends into the stem tube and, together with an aperture 14 formed in the side wall of the tube, provides a passageway for evacuating and mercury-dosing the lamp after the stem 11 has been sealed into the lamp envelope. A pair of lead wires 16, 17 are hermetically sealed through a press 15 formed on the end of the stem 11 and the ends of the wires are formed into clamps 18. These clamps are closed around the ends of a thermionic cathode consisting of a barrelless electrode coil 20 of non-recrystallized tungsten wire that is coated with a suitable electron-emission material E, such as the well-known mixture of alkaline earth oxides.

As will be noted, each end of the coil 20 is provided with a nodule such as a generally spherical bead 21 of fused ductile metal that extends across the end face of the coil. It will also be noted that the coating E of emission material is confined to the medial portion of the coil 20 and that the coil turns immediately adjacent the clamps 18 are uncoated. Such coils are referred to in the art as "barrelless" coils because they consist of a plurality of spaced turns that are of the same diameter and thus form a helix that is of linear configuration and the same cross-sectional dimension throughout its length. Such barrelless coils, accordingly, do not have the enlarged secondary turns and medial coil barrel portion characteristic of coiled-coil or triple-coiled filaments.

Figure 2:
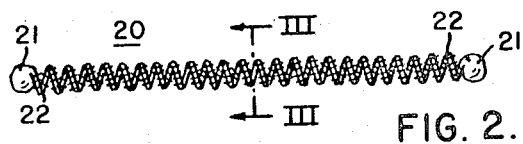
FIG. 2 is a front elevational view of the electrode coil before it is mounted on the lead wires and coated with emission material.

As shown in FIGS. 1 and 2, the beads 21 are integral with and terminate the end turns 22 of the coil 20 and are of approximately the same size as the outer diameter of the coil. The beads 21 accordingly merge with and close the ends of the coil 20.

Figure 3:
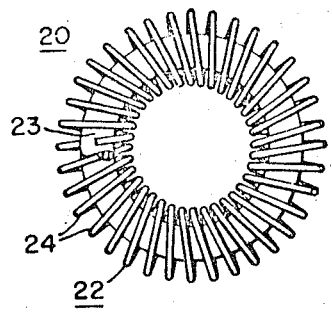
FIG. 3 is an enlarged cross-sectional view through the uncoated coil along the line III—III of FIG. 2.

As illustrated in the enlarged view of the coil 20 shown in FIG. 3, the coil consists of a coiled core wire 23 of suitable refractory material (non-recrystallized tungsten for example) which has a winding of fine refractory wire, such as non-recrystallized tungsten, loosely coiled therearound. The turns of the fine wire 24 enclose the core wire 23 and form a basket-like structure or matrix which increases the emission-holding capacity of the coil 20. When the medial portion of the coil 20 is coated with the emission material E after the coil is attached to the lead wires 16, 17, the emission material E fills the matrix formed by the loose overwinding of fine wire 24 and bridges the turns 22 of the coil 20, as is shown in FIG. 1.

Figure 4:
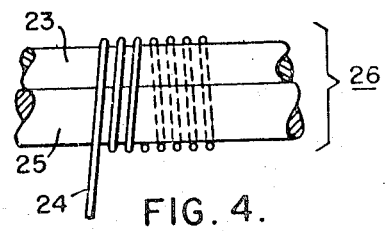
FIG. 4 is an enlarged elevational view of a segment of the composite wire used in making the coil shown in the preceding figures.
Figure 5:
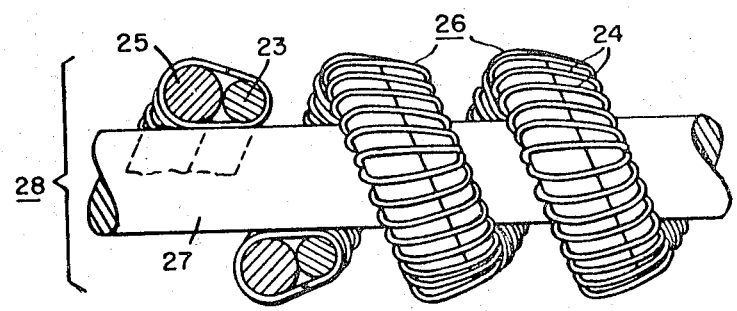
FIG. 5 is an enlarged perspective view of a portion of the aforementioned composite wire after it has been wound around the iron mandrel to form a continuous "stock" wire.

The electrode coil 20 is manufactured by pairing the tungsten core wire 23 with a slightly larger filler wire 25 of dissimilar metal, such as iron, that can be subsequently chemically dissolved from the wound coil without affecting the tungsten core wire. The paired tungsten core wire 23 and iron filler wire 25 constitute a dual-strand core component. The fine tungsten wire 24 is then tightly wound around the paired core wire 23 and filler wire 25 (that is, the aforesaid dual-strand core component) to form the opposite wire 26 shown in FIG. 4. This composite wire 26 is, in turn, wound around an iron mandrel 27 at the required TPI to form a continuous coil-mandrel composite 28 shown in FIG. 5. For convenience, this composite 28 is referred to herein as the "stock" wire.

In the prior art, after the stock wire 28 was mechanically cut into segments of the desired lengths the resulting segments were placed in an acid bath (e.g., hydrochloric acid) which dissolved the iron filler wire 25 and iron mandrel 27 and thus produced a finished coil consisting of the coiled tungsten core wire 23 and loose overwinding of fine tungsten wire 24. Since the tungsten core wire 23 is of such small diameter, it is impossible as a practical matter to mechanically cut it cleanly. As a result, burrs were unavoidably left on the cut ends. Because the core wire 23 is only loosely enclosed by the fine wire winding 24, the burred ends of the core wire naturally protruded from the ends of the finished coils and created the aforementioned snagging and tangling problem when the coils were placed into a hopper and handled en masse.

In accordance with the present invention, this snagging and tangling problem is solved by melting the ends of the iron mandrel 27, before the latter is chemically removed, and thereby forming an integral nodule or bead 21 of fused ductile tungsten-iron alloy at each end of the segments of stock wire 28. Since the acid that is used to dissolve the iron mandrel 27 and filler wire 25 does not attack tungsten, these tungsten-iron alloy beads 21 remain in place on the end turns of the finished coil 20, as shown in FIGS. 1 and 2, after the iron components have been removed.

When the iron mandrel 27 is melted the resultant pool of molten iron dissolves the overlying tungsten components of the composite wire 26 so that the ends of the core wire 25 and overwound fine wire 24 merge with and are anchored in the respective beads 21. The end turns of the finished coil 20 are thus terminated by globular beads 21 that are substantially smooth and larger than the spacing between the coil turns 22, thereby completely eliminating the troublesome burred ends and interlocking problem characteristic of the prior art coils. The improved beaded-end coils 20 of the present invention, accordingly, can be processed and shipped in bulk without the coils snagging one another and becoming entangled. As a result, they can be readily separated and supplied to a mounting machine by a suitably designed automatic coil-feeder.

While various concentrated and controllable heat sources, such as a focused electron beam, a plasma torch or a sharply defined oxy-hydrogen flame, can be used to melt the ends of the iron mandrel 27, a laser beam is preferred since it can be readily focused with great accuracy onto the ends of the iron mandrel.

Figure 6:
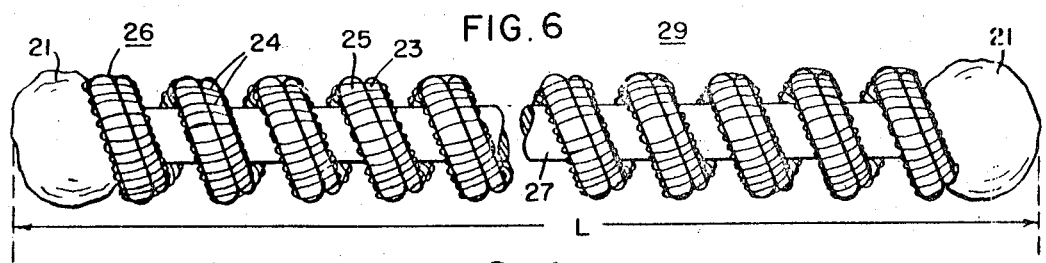
FIG. 6 is an enlarged elevational view of a severed segment of stock wire after the beads have been formed at each end and before the iron mandrel and iron filler wire have been dissolved.

A segment 29 of non-recrystallized stock wire 28 that has enlarged integral beads 21 of ductile tungsten-iron alloy formed on each end by means of a laser beam in accordance with the present invention is shown in FIG. 6. As will be noted, the beads 21 merge and are integral with the ends of the composite wire 26 that is wound about the iron mandrel 27. Such segments 29 are of precisely controlled length L and are, in effect, embryonic coils in that they need only be immersed in an acid bath, washed and dried to be transformed into finished coils.

METHOD-CONCURRENT BEADING AND SEVERING (FIGS. 7-8)

An important feature of the invention resides in the concept that the beading and severing of the stock wire 28 into segments 29 can be achieved simultaneously by a single operation. The various stages of such a concurrent beading-severing operation are illustrated in FIGS. 7a to 7b and will now be described.

Figure 7A:
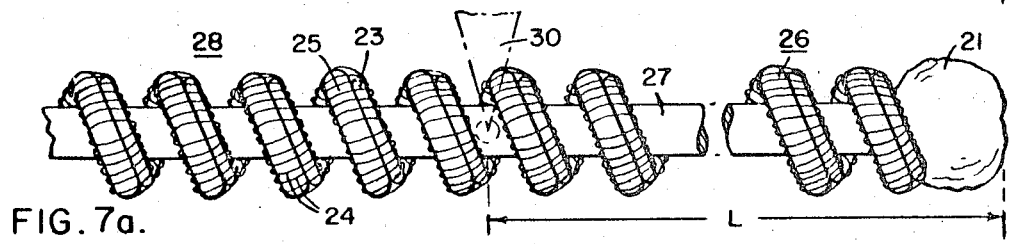
FIGS. 7a to 7d are elevational views of a section of stock wire illustrating the various steps in concurrently beading and severing an embryonic coil segment from the end of a continuous supply of stock wire in accordance with the invention.
Figure 7B:
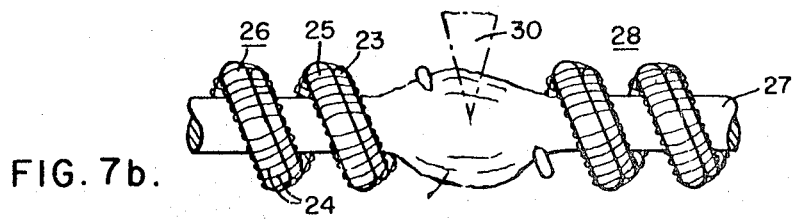
Figure 7C:
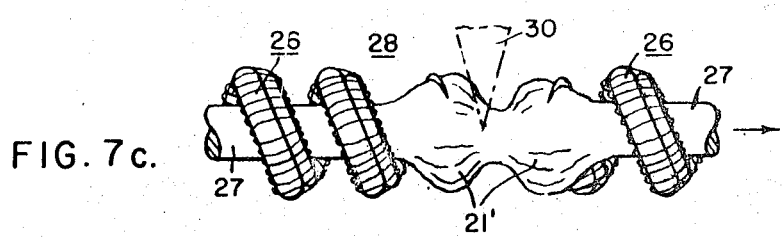
Figure 7D:
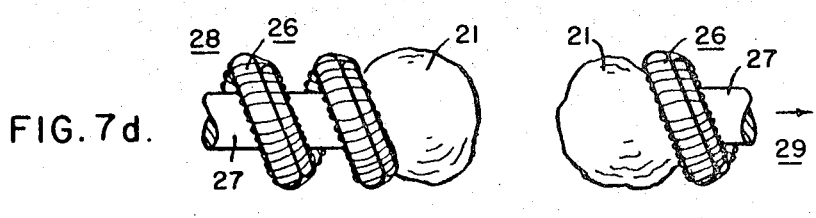

As shown in FIG. 7a, the stock wire 28 is subjected to a laser beam 30 which is focused onto the axis of the iron mandrel 27 at a point located the desired distance L from the end of the bead 21 formed on the free end of the stock wire by the previous beading severing operation. The intense heat generated by the impinging laser beam 30 rapidly melts the iron mandrel 27 and forms a pool of boiling iron which melts the overlying portion of the iron filler wire and the corresponding portions of the tungsten core and fine wires 23, 24 that constitute the composite wire 26. A molten pool 21' of tunsten-iron alloy is thus formed by the impinging laser beam 30, as shown in FIG. 7b. When this occurs an axial pull, indicated by the arrow in FIG. 7c, is applied to the free end of the stock wire 28 which causes the molten pool 21' to begin to subdivide into two globular masses. The axial pull or force is maintained until the molten pool of tungsten-iron alloy completely separates. The laser is then turned off and, due to the surface tension of the molten alloy remaining on the severed ends of the stock wire 28, the respective globular masses of molten alloy inherently take the shape of generally spherical beads 21 which are integral and merge with the severed ends of the composite wire 26, as shown in FIG. 7d.

The molten globules of alloy rapidly solidify, thus providing fused tungsten-iron beads 21 on the end of the free end of the stock wire 28 and on the proximate end of the newly-formed segment 29 which has just been severed. The beaded segment 29 (depicted at the right in FIG. 7d) is accordingly identical with the segment 29 shown in FIG. 6 and is of predetermined length L.

Figure 8:
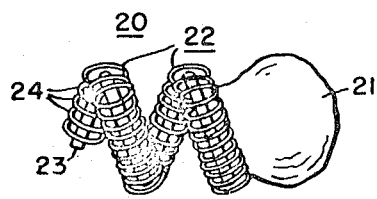
FIG. 8 is a similar view of one end of the finished non-recrystallized tungsten wire electrode coil after the iron mandrel and filler wire have been removed from the severed segment of stock wire.

As illustrated in FIG. 8, the beads 21 merge and are fused with the ends of the tungsten core wire 23 and overwinding of fine tungsten wire 24 in the finished coil 20. The beads 21 thus firmly anchor the tungsten wires in place and provide a smooth rounded closure at each end of the finished coil 20 which is too large to fit between the turns 22 of other such coils and thus inherently prevents coil tangling.

After the severed-beaded segment 29 is withdrawn and deposited in a hopper, the stock wire 28 is advanced a distance L relative to the laser and the operation just described is repeated. If the laser beam intensity and the length of time the laser is energized are properly correlated with the rate at which the stock wire 28 is indexed and the application and strength of the axial pull on the end of the stock wire, the operation can be repeated at a rapid rate to mass produce segments 29 of stock wire that are very uniform in length and beaded at each end. A preferred apparatus which meets each of these requirements is described hereinafter.

It should be noted that the laser beam 30 does not actually cut the stock wire 28 in the strict sense of the term but merely melts the iron mandrel 27 and forms a pool of boiling iron which then dissolves the overlying portions of the composite wire 26 to form a bulbous mass of molten tungsten-wire alloy. The severing of the stock wire 28 is thus actually accomplished by the axial pull exerted on the free end of the stock wire after the molten mass has been formed. This is an important feature of the invention since the temperature of the iron mandrel 27 adjacent the molten pool of tungsten-iron alloy is too low to effect recrystallization of the tungsten in the time it takes to achieve the melting and severing operations. If this were not the case, then the unmelted portions of the tungsten wires 23, 24 would be recrystallized and become brittle with the result that the beaded end turns would fracture and separate from the finished coil 20 unless the latter were very carefully handled.

Preliminary test data indicates that the temperature of the iron mandrel 27 adjacent the molten pool 21' of tungsten-iron alloy is approximately 1,400°C whereas the recrystallization temperature of tungsten is about 1,900°C. Iron has a melting point of approximately 1,535°C. Thus, both the beads 21 and the tungsten wires comprising the turns 22 of the finished coil 20 are ductile and in an unrecrystallized state.

Another important feature of the invention in this regard is the fact that as the molten pool 21' of tungsten-iron alloy forms it grows in size (as shown in FIG. 7b) with the result that it is no longer in focused relationship with the laser beam 30. Thus, heating of the bulbous molten pool is automatically retarded and overheating of the alloy and possible vaporization and crystallization thereof by the laser beam is avoided. In addition, since the composite wire 26 is of basket-like structure, it tends to hold the molten alloy so that approximately equal amounts of the alloy are retained on the severed ends of the stock wire when separation occurs.

It should also be pointed out that due to the intense heat generated by the impinging laser beam 30, melting and division of the molten alloy pool 21' are achieved almost instantaneously. Hence, the surface tension forces which are produced and the speed with which melting and separation occur prevents the molten metal from falling off the stock wire 28. It has also been found that the time required to melt the iron mandrel 27 and form the molten tungsten-iron pool 21' can be markedly decreased by directing a fine jet of oxygen onto the stock wire 28 at the site of laser beam impingement. The resulting oxidizing atmosphere at the site of melting produces controlled combustion which increases the amount of heat generated during the laser-melting phase of the operation. Accordingly, the preferred method of simultaneously beading and severing includes the use of a controlled jet of oxygen at the melting site.

Analysis of fused tungsten-iron beads formed on the ends of barrelless tungsten electrode coils 20 of the type described shows that the beads consisted of 75% Fe, 20% W and approximately 5% $Fe_2W$ (weight percent). On the basis of a published 38% Fe-W phase diagram by Hansen, it is theorized that approximately only 4.5 percent (by weight) of the tungsten was in solid solution with the iron and thus constituted a true tungsten-iron alloy. The remainder of the tungsten and iron was not alloyed and comprised admixed metal in the form of a two-phase Fe-W casting or body. The term "tungsten iron alloy" as used herein and in the claims accordingly covers an admixture of Fe and W that is fused but which may or may not contain a true solid solution or alloy of Fe-W.

SPECIFIC EXAMPLE — BARRELLESS COIL

As a specific example of the various values and parameters for those who wish to practice the invention, the barrelless 40 watt fluorescent electrode coil 20 of the type illustrated and described above has an overall length of approximately eleven-sixteenths inch (17 mm.). The diameter of the iron mandrel 27 is approximately 0.016 inch, the diameter of the iron filler wire 25 is approximately 0.005 inch, the diameter of the tungsten core wire 23 is approximately 0.0023 inch, the diameter of the overwound tungsten wire 24 is approximately 0.001 inch, and the diameter of the finished coil was approximately 0.03 inch. A 100 watt $CO_2$ laser was employed and its beam was focused into a spot on the iron mandrel that was approximately 0.005 inch in diameter. The wavelength of the radiation produced by the laser was 10.6 microns. The power density of the focused laser beam which impinged upon the iron mandrel was approximately 4 million watts per sq. inch. The laser was energized for approximately 0.07 second and a pull of approximately 5 ounces was applied to the free end of the stock wire 28 to sever the molten pool of tungsten-iron alloy. The entire beading and severing operation was completed within the time that the laser was energized, that is, within 0.07 second.

Removal of the iron mandrel 27 and iron filler wire 25 from the beaded segments 29 of stock wire 28 was accomplished by immersing the segments in concentrated hydrochloric acid for approximately 30 minutes and the resulting coils were then washed in deionized water and in alcohol and dried.

PREFERRED APPARATUS (FIGS. 9-11)

Figure 9A:
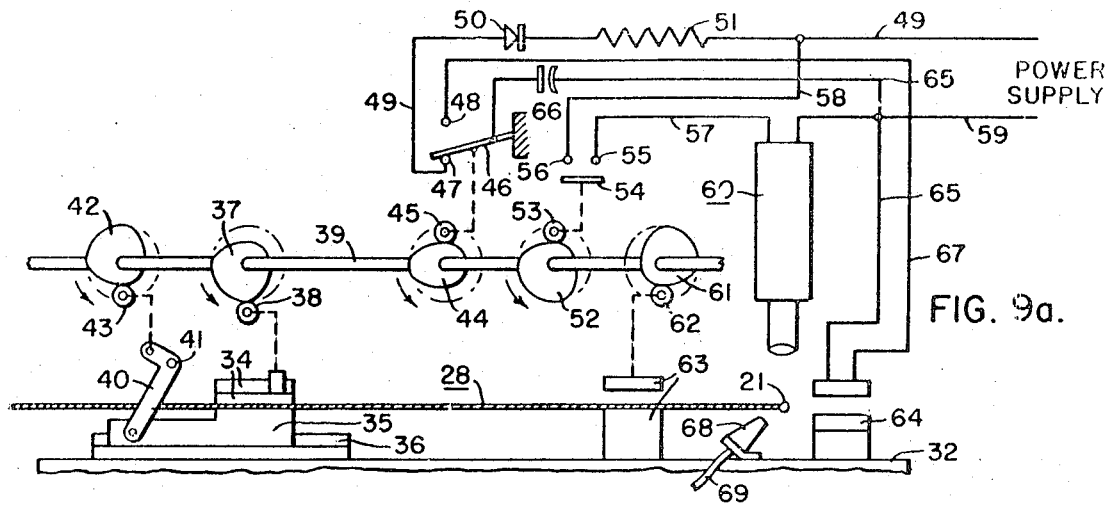
FIGS. 9a to 9d are schematic diagrams of an apparatus and electrical circuit for automatically severing a continuous length of stock wire into beaded segments of uniform length by means of a laser, the various operations being shown in sequence as the apparatus indexes through one cycle.

In FIG. 9a there is shown a schematic representation of a preferred apparatus and circuit for severing stock wire 28 into segments 29 of precisely controlled length and concurrently forming tungsten-iron alloy beads on each end of the individual segments in accordance with the present invention. The apparatus comprises a table 32 having a pair of clamping jaws 34 that are mounted on a carriage 35 that is reciprocally movable along a channeled retaining block 36 secured to the table. Only one of the jaws 34 is actuated and this is accomplished by a suitably shaped cam 37 and a cam-follower 38 that is coupled to the movable jaw 34 through a suitable linking mechanism. The cam 37 is rotated by a shaft 39 that is driven by a motor (not shown).

Figure 9B:
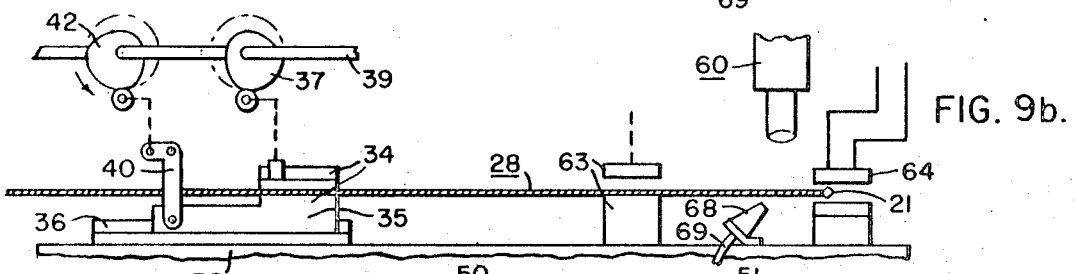
Figure 9C:
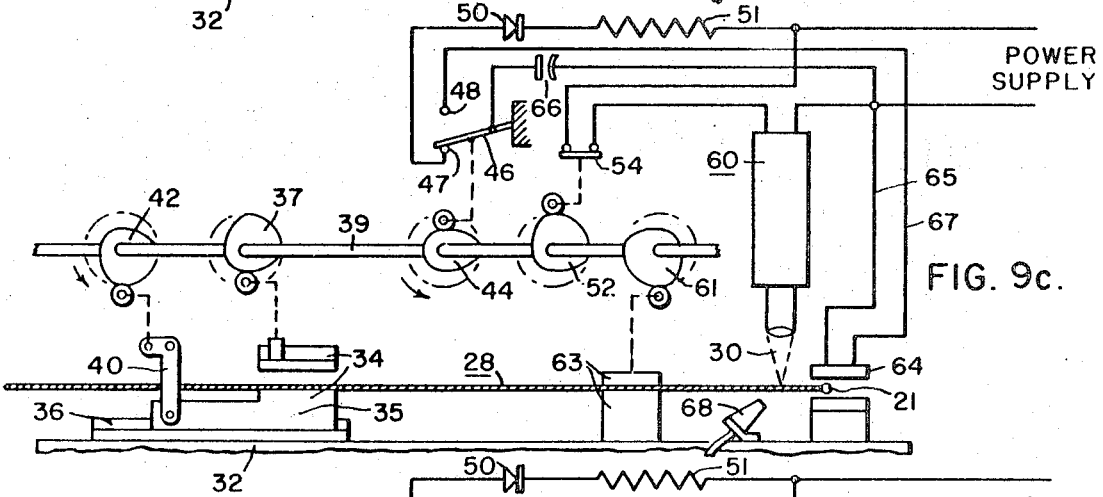
Figure 9D:
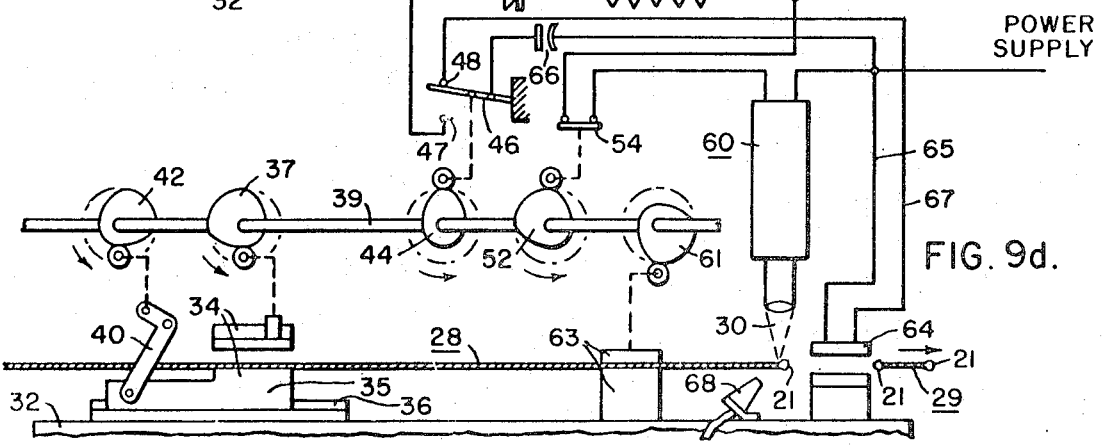

Reciprocal movement of the carriage 35 is achieved by a V-shaped rocker arm 40 that pivots about a stationary pin 41 and has one of its arms coupled to the carriage 35 and its other arm coupled to a second cam 42 through its cam-follower 43 and a suitable linkage means. The cam 42 is so contoured that it imparts a cranking motion to the rocker arm 40 which advances the carriage 35 a distance equivalent to the length of the segments 29 into which the stock wire 28 is to be severed, and then returns the carriage to its original position as the cam goes through one revolution. FIG. 9a shows the positions of the various cams and associated parts at the beginning of the cycle immediately after a segment 29 has been severed from one end of the stock wire 28 and ejected. FIGS. 9b–9d show the cams and various operations that take place as the drive shaft 39 has been rotated through 270° in 90° steps.

As is shown in FIG. 9a, a third cam 44 is mounted on the drive shaft 39 and has a cam-follower 45 which actuates a switch 46 through a suitable linkage means. The switch 46 engages one of a pair of contacts 47, 48, depending upon the position of the cam 44. At the beginning of the cycle illustrated in FIG. 9a, the switch 46 engages contact 47 which is connected by a conductor 49 to one side of an alternating current power supply through a rectifier 50 and a resistor 51. The other side of the switch 46 is connected to the other terminal of the power supply by a second conductor 65 through a condenser 66. Thus, the switch 46 in its initial position connects the condenser 66 directly to the power supply through the rectifier 50 and resistor 51 and the condenser 66 is thus being charged to a predetermined voltage that is controlled by the values of the rectifier and resistor.

A fourth cam 52 is mounted on the drive shaft 39 and has a cam-follower 53 which is mechanically coupled through a suitable linking means to another switch 54 which has a set of contacts 55, 56. Contact 55 is connected by a conductor 57 to one of the power input terminals of a $CO_2$ laser 60 and the other contact 56 is connected by a conductor 58 to conductor 49 and, thus, to one side of the power supply. The other input terminal of the laser 60 is connected to the other side of the power supply by another conductor 59. At the beginning of the cycle illustrated in FIG. 9a, the cam 52 is so oriented that switch 54 is in its "open" position as shown.

A fifth cam 61 is mounted on the drive shaft 39 and its cam-follower 62 is mechanically coupled by suitable linkage means to the movable jaw of a second pair of clamping jaws 63 which are mounted on the table 32 at a location adjacent the laser 60 in line with the first set of clamping jaws 34. An annular electromagnet 64 is mounted on the table 32 on the opposite side of the laser 60 from the jaws 63 and is coaxially aligned with the latter and the first set of jaws 34 so as to exert an axial pull on the free end of the clamped stock wire 28 when the magnet is energized. The electromagnet 64 is connected to one side of condenser 66 by conductor 65 and has its other terminal connected to switch contact 48 by a conductor 67.

Thus, when switch 46 subsequently engages contact 48 the electromagnet 64 is connected in series with the condenser 66 which discharges through the electromagnet. This pulse energizes the electromagnet 64 and produces a momentary magnetic field which attracts and exerts an axial force on the adjacent free end to the clamped stock wire 28, as hereinafter described. In the case of the barrelless electrode coil 20 described above in the specific example, the electromagnetic coil consisted of approximately 100 turns of copper wire having a diameter of one-sixteenth of an inch, the condenser 66 had a rating of 2,000 mfd, the resistor 51 was a 10 ohm resistor, the rectifier 50 was a commercially available diode rated for 20 amps, and 300 volts, and the power supply was 110 volts A.C.

Summarizing, at the beginning of the cycle depicted in FIG. 9a, cam 42 is so positioned that rocker arm 40 is ready to begin its forward stroke and shift the carriage 35 and pair of jaws 34 mounted thereon a predetermined distance toward the laser 60, cam 37 is positioned so that the jaws 34 are clamped around the stock wire 28, cam 44 is positioned so that switch 46 engages contact 47 and condenser 66 is being charged, cam 52 is positioned so that switch 54 is in its "open" position and the laser 60 is deenergized, cam 61 is positioned so that jaws 63 are open, and the electromagnet 64 is deenergized since switch 46 is maintained in engagement with contact 47 rather than contact 48 by the action of cam 44.

In order to increase the heating effect of the laser beam on the stock wire 28, a fine jet of oxygen is directed onto the focal point of the laser beam through a nozzle 68 mounted on the table 32. The nozzle is connected to an oxygen supply through a suitable conduit 69.

After the drive shaft 39 and various cams mounted thereon have rotated through an angle of 90°, the cams, jaws, etc. are in the positions shown in FIG. 9b. As illustrated, cam 42 has pivoted the rocker arm 40 which, in turn, has shifted the carriage 35 a predetermined distance toward the laser 60. Jaws 34 remain closed during this interval and thus index the clamped stock wire 28 the same distance toward the laser 60 so that the beaded free end of the stock wire is advanced a predetermined distance beyond the focal point of the laser. Cam 61 has kept jaws 63 open to permit the stock wire 28 to be so advanced. Cams 44 and 52 (not shown in FIG. 9b) retain switches 46 and 54 in the positions shown in FIG. 9a so that condenser 66 is still being charged and the laser 60 and electromagnetic coil are still deenergized.

After the drive shaft 39 and respective cams have rotated an additional 90° (180° total), as shown in FIG. 9c, cam 42 has allowed the rocker arm 40 to remain stationary so that the carrier 35 is still at the end of its forward stroke. However, cam 37 has opened jaws 34 which thus release the stock wire 28 in readiness for the return stroke of carriage 35 and jaws 34. Cam 44 maintains switch 46 in engagement with contact 47 so that condenser 66 is still charging and the electromagnet 64 is still deenergized. However, cam 52 has actuated and closed switch 54 so that the laser 60 is energized and its focused beam 30 is impinging upon the iron mandrel portion of the stock wire 28 at a point located a predetermined distance inwardly from its previously beaded end 21.

After an additional 90° advance of the drive shaft 39 (that is, after three quarters of a revolution), the cams and associated components are in the positions illustrated in FIG. 9d. Cam 42 has actuated the rocker arm 40 and returned the carriage 35 and jaws 34 to their starting position while cam 37 has retained the jaws 34 in their open position. Cam 44 has actuated switch 46 causing condenser 66 to discharge through the electromagnet 64 and the resulting magnetic field has separated the end segment 29 of the stock wire 28 at the point where it has been melted by the action of the laser beam 30 and has propelled the segment through the annular electromagnet. The laser 60 is maintained in energized condition by the action of cam 52 which retains switch 54 in its closed position. Clamping jaws 63 are kept closed by cam 61 and thus hold the stock wire 28 stationary during the severing operation. As illustrated, the severed segment 29 of the stock wire has tungsten-iron alloy beads 21 formed at each end and the segment is propelled through the annular electromagnet 64 and falls into a hopper (not shown). A fused tungsten-iron alloy bead 21 is also formed and remains on the free end of the stock wire 28 and the latter is ready to be indexed a predetermined distance beyond the laser 60 for the next severing operation.

As the drive shaft 39 and respective cams 37, 42, 44, 52, and 61 rotate another 90° and complete one revolution, clamping jaws 34 are closed, jaws 63 are opened, switch 46 returns into engagement with contact 47 thus deenergizing the electromagnet 64 and initiating the recharging of condenser 66, and switch 54 returns to the "open" position deenergizing the laser 60. Thus, at the end of one complete revolution of the drive shaft 39 the various cams clamping jaws and switches are again in the positions shown in FIG. 9a, the laser 60 and electromagnet 64 are deenergized, and the capacitor 66 is starting to recharge and the cycle just described is repeated.

The jet of oxygen flows continuously from the nozzle 68 so that the melting, severing and beading of the stock wire 28 takes place in an oxidizing atmosphere.

It will be apparent from the foregoing description that the cams 37, 42, 44, 52 and 61 operate the clamping jaws 34 and 63 and carriage 35 in timed sequence with the operation of the switches 46 and 54 so that the laser 60 and electromagnet 64 operate in unison with the movement of the stock wire 28 in a repetitive and rapid fashion and sever the stock wire 28 into segments 29 that have beads 21 formed at each end and are of predetermined uniform length. Experience has shown that a machine incorporating the features described will operate at a speed of 400 indexes per minute using a 100 watt $CO_2$ laser and thus produce a corresponding number of segments 29 of beaded embryonic coils (of the type described in the specific example above) in one minute when a fine air jet of oxygen is directed into the melting zone. Since the oxygen jet provides controlled combustion in the melting zone, it materially decreases the time required to melt the iron mandrel 27 without increasing the power of the laser. This permits the machine to be operated at a faster index speed than would be the case if the oxygen jet were omitted and melting were performed in an inert nitrogen atmosphere or in air.

An actual production machine that operates in the manner just described is shown in FIG. 10. As illustrated, the machine consists of a table 32 having a centrally located elongated platform 70 on which the clamping jaws 34 and 63 are mounted. A motor 71 secured to one corner of the table 32 rotates the drive shaft 39 which carries the cams 37, 61, 44 and 52. In this embodiment the cam 42, cam-follower 43, and rocker arm 40 illustrated in the apparatus shown in FIGS. 9a to 9d are replaced by a linking arm 72 that is coupled to the carriage 35 and to a circular drum 73 which is rotated by a shaft 74 driven by the main shaft 39 through a set of bevel gears 75. These shafts are supported and held in operative relationship with one another by brackets 76 that are secured to the table 32 and are provided with suitable bearings which permit the respective shafts to rotate freely.

The linking arm 72 is secured to the drum 73 at a point which is offset from the axis of the drum a distance such that the carriage 35 is first moved forward along a channel 77 in the retainer block 36 a distance that is equal to the length of the segments 29 that are to be severed, and is then returned to its starting position as the drum rotates through 360°. This arrangement is thus functionally equivalent to the cam rocker arm combination shown in FIGS. 9a-9d.

Cam 37 is identified in the machine shown in FIG. 10 as cam No. 1 and operates the movable jaw 34 through a cam-follower 38 that is carried by a connecting rod 78 which is keyed to the end of the movable jaw 34 by a pin and slot arrangement 79. The connecting rod 78 is movably held in operative relation with the cam 37 and movable jaw 34 by a bracket 80 that is secured to the table 32. The clamping jaws 34 (identified in FIG. 10 as clamp No. 1) are accordingly reciprocally movable toward and away from the laser 60 along a prescribed path and can be opened and closed at the beginning and end of the stroke of the carriage 35.

The second set of jaws 63 (identified in FIG. 10 as clamp No. 2) is actuated by coupling the movable jaw to the cam 61 (identified in FIG. 10 as cam No. 2) through its follower 62 and a V-shaped rocker arm 81 that is pivotally mounted on the table 32 and secured to a linking pin 82 carried by the movable jaw 63. The latter is held in operative relationship with the rocker arm 81 and linking pin 82 by a housing 83 secured to the top of the platform 70. Switch 46 (identified in FIG. 10 as switch No. 1) which controls the electromagnet 64 is actuated by a smaller cam 44 of suitable contour and its cam-follower 45. Switch 54 (identified in FIG. 10 as switch No. 2) which controls the laser 60 is operated by a similar cam 52 and its cam-follower 53.

The 100 watt $CO_2$ laser 60 is supported in vertical position above the table 32 by a bracket 84 and the annular electromagnet 64 is held in aligned relationship with clamps No. 1 and No. 2 by a support block 85 that is secured to the table. The stock wire 28 is wound on a spool 86 that is secured to the underside of the table 32 by means of a bracket 87. The free end of the stock wire 28 is drawn over a pulley 88 that is located directly above the spool 86 and rotatably held in such position by a support arm 89 that is attached to the top of the table 32. The stock wire 28 passes through clamp No. 1 and clamp No. 2 and through a nozzle-shaped wire-guide member 90 that is attached to the platform 70 and so oriented that the free end of the stock wire is aligned with the focused laser beam 30 and lies adjacent to and in generally coaxial relationship with the annular electromagnet 64.

The phase diagram of the machine is shown in FIG. 11 and, as illustrated, the various cams and the indexing-drive mechanism (linking arm 72 and drum 73) are so designed that when the drive shafts 39, 74 are rotated 180° (the forward stroke of carriage 35), clamp No. 2 remains open and the laser 60 and electromagnet 64 are deenergized. During the next 180° of revolution (that is, the return stroke of the carriage 35), clamp No. 1 is opened, clamp No. 2 is closed, the laser 60 is energized and the electromagnet 64 is momentarily energized at the very end of the cycle. Thus, the stock wire 28 is periodically indexed by the coaction of clamps No. 1 and No. 2 through the guide 90 and predetermined beaded segments 29 are severed from the free end of the stock wire and propelled through the annular electromagnet 64 by its magnetic field into a hopper 91.

ALTERNATIVE EMBODIMENT (FIG. 12)

Figure 12:
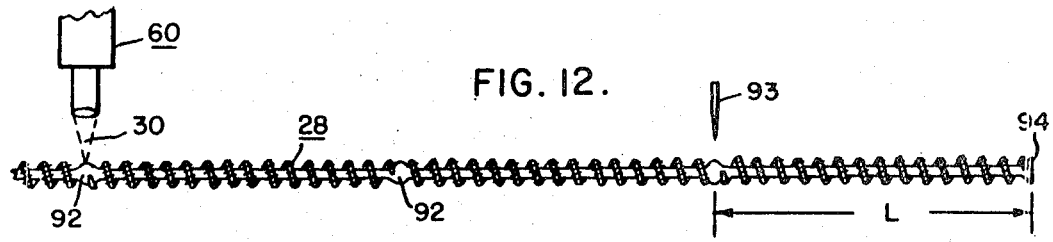
FIG. 12 is an elevational view showing an alternative method of separately beading and severing stock wire into embryonic coil segments using a laser and a cutting knife.

In FIG. 12 there is shown an alternative method for severing a continuous length of stock wire 28 into a plurality of segments of predetermined length L by means of a laser-beading operation and a subsequent separate cutting operation. As shown, the stock wire 28 is indexed in a predetermined manner past a laser 60 which is energized in timed sequence with the index speed so that the stock wire 28 is melted at a plurality of uniformity spaced points to provide a series of fused tungsten-iron alloy nodules or beads 92. These beads 92 are subsequently mechanically severed by a knife 93 to provide individual segments of predetermined length L. In contrast to the segments previously described, the segments formed in accordance with this embodiment are terminated at each end by a bisected globular bead 94 that have substantially flat end faces. In the finished coil, these bisected beads 94 extend transversely of the coil axis and are integral with and terminate the respective end turns of the coil.

ALTERNATIVE EMBODIMENT (FIG. 13)

Figures 13, 15, 16:
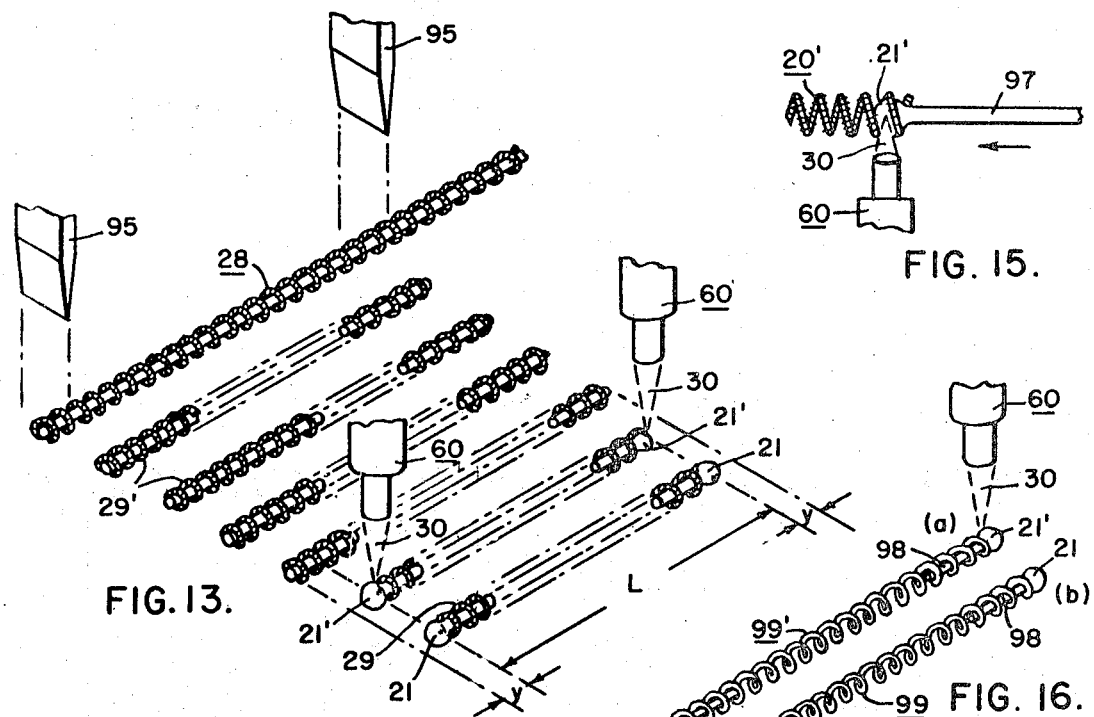
FIG. 13 is a perspective view illustrating another method wherein beads are simultaneously formed on both ends of precut segments of stock wire.
FIG. 15 is a similar view depicting another bead-forming method wherein the end of a metal wire is being melted and fused with the end turn of a preformed coil as the wire is being fed into the coil.
FIG. 16 is a perspective view illustrating a method for forming beads as integral parts of leg inserts of a preformed coil.

In FIG. 13 there is shown another method of providing fused metallic beads on the ends of a refractory wire coil in accordance with the present invention. In this embodiment the sequence of operations is reversed from that shown in the FIG. 12 embodiment. As illustrated, the stock wire 28 is first cut into individual segments 29' by a pair of cutting knives 95 that are so spaced that the segments are initially longer than the desired finished length L and sections of a length Y protrude from each end of the cut segments. The protruding sections are of such length that, when melted, they will form tungsten-iron beads of the desired size. In the case of the 40 watt barrelless electrode coils described above, the protruding sections are each approximately ½ mm. in length.

The precut segments 29' of wire stock 28 are aligned with one another and indexed, as by a suitable conveyor, past a pair of lasers 60 that are so spaced and energized that their beams 30 strike and melt the protruding sections of the respective segments 29' as they are indexed into aligned position with the lasers. The resulting pools 21' of molten alloy inherently formed globular beads 21 of such size that the finished segments 29 are of the desired length L. As will be obvious, the foregoing sequence of operations can be automated by providing suitable means for actuating the knives 95 in timed sequence with the index of the conveyor and the operation of the lasers 60.

ALTERNATIVE EMBODIMENT (FIG. 14)

A method for making beaded tungsten electrode coils (or filaments) which require a heat-treating operation to set the coil on the mandrel is shown in FIGS. 14a through 14d. According to this embodiment, the filler wire and mandrel are composed of a dissimilar refractory metal, such as molybdenum which will withstand the heat-treating temperature. The resulting heat-treated stock wire is mechanically cut into segments of predetermined length and the refractory mandrel and filler wire are chemically dissolved in the regular fashion to provide a tungsten coil 20' (FIG. 14a) that is identical to the prior art coils in that it consists of a tungsten core wire 23 and a loose overwinding of fine tungsten wire 24. However, the coil 20' is slightly longer than the desired finished length.

As shown in FIG. 14b, small rod-like sections 96 of iron wire are inserted into each end of the coil 20' so that the ends of the respective wire sections are substantially flush with the end turns of the coil. The ends of the coil 20' are then aligned with a pair of lasers 60 that are so spaced that the focused laser beams 30 strike the inserted iron wire sections at preselected points located inwardly from the ends of the coil (as shown in FIG. 14c). The spacing between the lasers 60 is such that the finished coil 20 (FIG. 14d) has the desired integral beads 21 of tungsten-iron alloy formed at each of its ends and the coil is of the desired predetermined length L. This method thus enables beaded tungsten wire coils to be made with refractory metal mandrels which have a melting point too high to permit them to be melted into beads without recrystallizing the tungsten wire coil.

ALTERNATIVE EMBODIMENT (FIG.15)

Figures 14, 17:
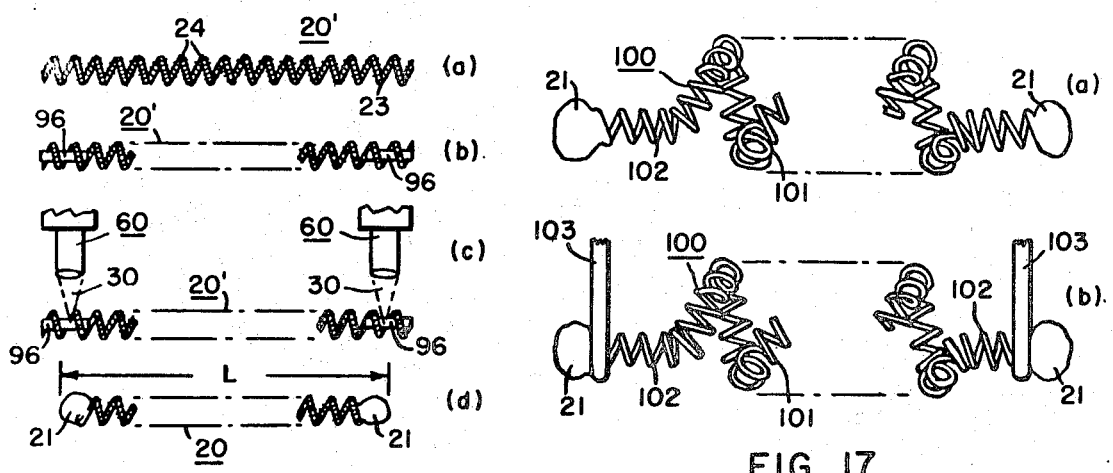
FIGS. 14a to 14d are elevational views illustrating various operations according to another alternative method for forming beads wherein short pieces of metal wire are inserted into the ends of a previously formed coil and then melted with lasers to form the desired integral fused beads.
FIGS. 17a–17b are enlarged elevational views of a beaded coiled-coil filament and the associated lead wire portions of a mount assembly for an incandescent lamp, respectively, illustrating the manner in which enlarged beads are used to control the "lighted length" of the mounted filament.

Instead of inserting precut lengths of iron wire into the ends of a mandreless tungsten wire coil 20' as illustrated in FIG. 14, a wire 97 composed of iron (or other suitable metal) can be fed axially into one end of the coil 20' concurrently melted by a laser beam 30 to form a molten ball 21' of iron that is located within the end turn of the coil and dissolves the latter to form an integral bead of molten tungsten-iron alloy. After the end turn of the coil 20' has been dissolved the laser 60 is de-energized and the resulting bead is allowed to cool. The iron wire 97 is then severed flush with the outer end of the bead either by the laser 60 or by a knife. The iron wire 97 can also be fed into the coil 20' between its turns from a position located to one side rather than at the end of the coil.

ALTERNATIVE EMBODIMENT (FIG. 16)

The present invention can also be used to provide an electrode or a filament coil of tungsten wire that has a fused metal bead at each end which forms an integral part of a coil leg insert. This embodiment is shown in FIG. 16 and consists of inserting section 98 of iron wire or rod into each end of a performed tungsten wire coil 99' and melting back the ends of the tungsten coil and iron wire sections to form pools 21' molten tungsten-iron alloy (one of which is shown in FIG. 16a). This embodiment is thus quite similar to that shown in FIG. 14 except that the sections 98 of iron wire are longer and only the outer ends thereof are melted by the laser beam 30. Hence, the finished coil 99 (FIG. 16b) is provided at each end with a fused tungsten-iron bead 21 which constitutes the end of the unmelted portion of the respective iron wires 98, and the unmelted wire portions enclosed by the coil turns serve as leg inserts.

When the finished coil 99 is mounted on its lead wires, the latter are fastened either by spot welding or clamping to the end portions of the coil that contain the iron wire inserts 98. While the medial portion of the coil 99 is here shown as comprising a plurality of uniformly spaced primary turns of the same diameter, such medial portion can comprise a plurality of larger-diameter secondary turns of a coiled-coil filament of the type used in incandescent lamps and as heavy-duty electrodes in high-output fluorescent lamps.

ALTERNATIVE EMBODIMENT (FIG.17)

The novel terminating beads of fused ductile metal provided by the present invention can also be advantageously employed to control the effective "lighted-length" of an incandescent lamp filament and this embodiment is shown in FIG. 17. As is illustrated in FIG. 17a, the filament 100 can be of coiled-coil construction and thus have a medial barrel portion comprising a plurality of spaced secondary turns 101 which is terminated by longitudinally-extending coil legs 102. Each of these legs are provided with beads 21 of fused tungsten-iron alloy. As shown, the beads 21 are larger than the outer diameter of the coil legs 102 and are spaced a predetermined distance apart.

As shown in FIG. 17b, the coiled-coil filament 100 is mounted on the lead wires 103 of the mount assembly in such a manner that the latter are contiguous to and preferably abut against the inwardly-disposed surfaces of the respective beads. Since the beads 21 are spaced a precise distance apart, they serve as guides or "reference points" during the clamping operation and provide a very economical and reliable means for accurately controlling the length of the filament 100 which is suspended between the lead wires 103. The effective lighted length of the mounted filament 100 can thus be maintained within very tight tolerances.

It will be appreciated from the foregoing that the objects of the invention have been achieved in that a practical and successful solution to the coil-tangling problem encountered in the production and handling of barreless type electrode coils has been provided. The beaded-end coils can be readily mass-produced and drastically reduce shrinkage. By making suitable modifications in the process, filament coils having beaded-end leg inserts can be produced.

While several coil embodiments as well as methods and apparatus for manufacturing such coils have been illustrated and described, it will be appreciated that various modifications in the foregoing can be made without departing from the spirit and scope of the invention. For example, the invention is not limited to tungsten coils that are wound on iron mandrels. Any combination of dissimilar metals which, when melted, coact to form ductile beads that are composed of a mixture of the fused metals and do not embrittle the wire coil can be employed. Thus, mandrels or inserts of a metal (such as nickel, copper, aluminum, cobalt or titanium) which has a melting point of the same order of magnitude as iron can be used with a tungsten or similar refractory wire coil.

Also, concurrent beading and severing of the stock wire 28 can be achieved by applying an axial pull on the end of the stock wire by a mechanical device instead of the annular electromagnet 64 which is illustrated and described. Such mechanical device can comprise a wire-gripper that is actuated by a suitable cam-linkage mechanism in timed sequence with the indexing of the stock wire and operation of the laser 60 to pull and separate the end segment of the stock wire in the same manner as the electromagnet.

The invention can be employed to inhibit tangling of coiled articles which are wound from heavier wire than that used in the filamentary electrode coil 20 disclosed herein and the nodules can be formed on the very ends of the wire. The nodules in this case may be only slightly larger than the wire diameter -- the important thing being that the ends of the wire are provided with smooth surfaces which will not snag the turns of other coils and cause the coils to become entangled when placed in a container, or when being processed or handled en masse. If the coiled member has a leg section at each end, such leg section can comprise an uncoiled length of wire which is terminated by a nodule that is of the same size or only slightly larger than the wire diameter. The terms "nodule" or "bead" as used herein and in the claims accordingly include within their scope a quantity of fused material which provides a generally smooth non-snagging surface at the end of a member, such as a metal wire, which has been wound into a coil.

We claim as our invention:
1. In the manufacture of a helical coil of refractory metal wire, the method of forming an integral tangle-free nodule of fused ductile metal on the end of said helical coil without recrystallizing the refractory metal, which method comprises;
   inserting into the end turn of said coil a member composed of a metal that has a lower melting point than and fuses with the refractory metal which comprises said coil,
   heating said inserted metal member until it melts and fuses with the overlying end turn of said refractory metal wire coil, and
   allowing the resulting nodule of fused metal to cool and solidify.
2. The method of claim 1 wherein;
   said heating of the inserted metal member is achieved by subjecting the member to a laser beam and said metal member is of such length that its inner end is located a predetermined distance from the end turn of said coil, and
   said inserted metal member and laser beam are so positioned that only the outer end of said metal member is melted by the laser beam and the resulting nodule of fused metal is located at the outer end of said member and the unmelted inwardly-disposed portion of said member thus constitutes a leg insert for said coil.
3. In the manufacture of a coiled self-supporting article which, in its finished state, is hollow and has a plurality of spaced freely-suspended turns at each end and is thus susceptible to tangling when handled en masse with similar coiled articles, the method of providing a substantially smooth and non-tangling terminus on each end of said article comprising the steps of;
   placing in contiguous relationship with each of the freely-suspended end turns of said coiled article a body of dissimilar material which has a lower melting point than and fuses with the material from which said article is made,
   heating said bodies of dissimilar material until they melt and fuse with the respective end turns of said coiled article and form molten nodules that are located at and are integral with the said respective end turns of said article, and then
   cooling said molten nodules while they are still attached to the end turns of said article and the latter are thereby each terminated by a solidified nodule of fused material.
4. The method of claim 1 wherein the heating of said bodies of dissimilar material is achieved by means of a focused laser beam.
5. The method of claim 3 wherein;
   said coiled article comprises an elongated helix of metal wire, and
   said bodies of dissimilar material comprise members of dissimilar metal that are placed within only the end turns of said metal wire helix.
6. The method of claim 5 wherein;
   said helically coiled article is composed of tungsten wire, said members of dissimilar metal are composed of iron, and the resulting nodules are composed of fused admixed iron and tungsten at least a portion of which is in the form of tungsten-iron alloy.

* * * * *